(12) United States Patent  
Lachnitt

(10) Patent No.: US 9,397,718 B2  
(45) Date of Patent: Jul. 19, 2016

(54) MOBILE TELEPHONE HOLDING DEVICE

(71) Applicant: Peiker Acustic GmbH & Co. KG, Friedrichsdorf (DE)

(72) Inventor: Jens Lachnitt, Alsfeld (DE)

(73) Assignee: Peiker Acustic GmbH & Co. KG, Friedrichsdorf (DE)

(*) Notice: Subject to any disclaimer, the term of this patent is extended or adjusted under 35 U.S.C. 154(b) by 0 days.

(21) Appl. No.: 14/615,746

(22) Filed: Feb. 6, 2015

(65) Prior Publication Data

US 2015/0229345 A1 Aug. 13, 2015

(30) Foreign Application Priority Data

Feb. 11, 2014 (DE) .......................... 10 2014 001 711
Nov. 28, 2014 (DE) .......................... 10 2014 117 488

(51) Int. Cl.

| | |
|---|---|
| *H04B 1/38* | (2015.01) |
| *H04M 1/00* | (2006.01) |
| *H04B 1/3877* | (2015.01) |
| *B60R 11/02* | (2006.01) |
| *F25B 21/02* | (2006.01) |
| *H02J 7/02* | (2016.01) |
| *H02J 7/00* | (2006.01) |
| *H04B 1/036* | (2006.01) |
| *H04M 1/04* | (2006.01) |
| *B60R 11/00* | (2006.01) |

(52) U.S. Cl.
CPC .......... *H04B 1/3877* (2013.01); *B60R 11/0241* (2013.01); *F25B 21/02* (2013.01); *H02J 7/0044* (2013.01); *H02J 7/025* (2013.01); *B60R 2011/0075* (2013.01); *H04B 1/036* (2013.01); *H04M 1/04* (2013.01)

(58) Field of Classification Search
CPC ... H04M 1/04; H04M 1/6041; H04M 1/6066; H04M 1/6075; H04B 1/036; H04B 1/3822; H04B 1/3877; H04B 1/3888; H02J 7/0044; H02J 7/025; B60R 11/0241; B60R 2011/0059; B60R 2011/0071
USPC ........ 455/90.3, 556.1, 557, 573, 575.1, 579.1
See application file for complete search history.

(56) References Cited

U.S. PATENT DOCUMENTS

| | | | | |
|---|---|---|---|---|
| 7,013,163 | B2* | 3/2006 | Jaggers ................. | H02J 7/0044 455/90.3 |
| 8,024,012 | B2* | 9/2011 | Clevenger ............... | H02J 17/00 455/573 |
| 8,330,414 | B2* | 12/2012 | Takahashi ............. | H01M 10/44 320/108 |
| 9,007,017 | B2* | 4/2015 | Howard ................ | H02J 7/0054 320/107 |

(Continued)

FOREIGN PATENT DOCUMENTS

DE 10 2011 110 680 A1 12/2012

*Primary Examiner* — Quochien B Vuong
(74) *Attorney, Agent, or Firm* — Burr & Brown, PLLC

(57) ABSTRACT

The present invention relates to a mobile telephone holding device which includes a main body, an arm, at least two clamping elements, a wireless electrical charging device with which a mobile telephone can be charged and an electrical switching device, wherein the arm s mounted on the main body in such a way that the arm can be moved between an inoperative position (R) and at least one holding position (H) against a restoring force, wherein the electrical switching device, depending on the position of the arm, interrupts an electrical line which leads to the charging device in the inoperative position (R) of the arm, and closes the electrical line which leads to the charging device in each holding position (H) of the arm.

8 Claims, 4 Drawing Sheets

(56) References Cited

U.S. PATENT DOCUMENTS

| | | | |
|---|---|---|---|
| 9,080,714 B2 * | 7/2015 | Minn | B60R 11/0241 |
| 9,270,130 B2 * | 2/2016 | Arai | H02J 7/0042 |
| 2008/0298026 A1 * | 12/2008 | Wang | G06F 1/163 361/728 |
| 2012/0313576 A1 | 12/2012 | Peiker | |

* cited by examiner

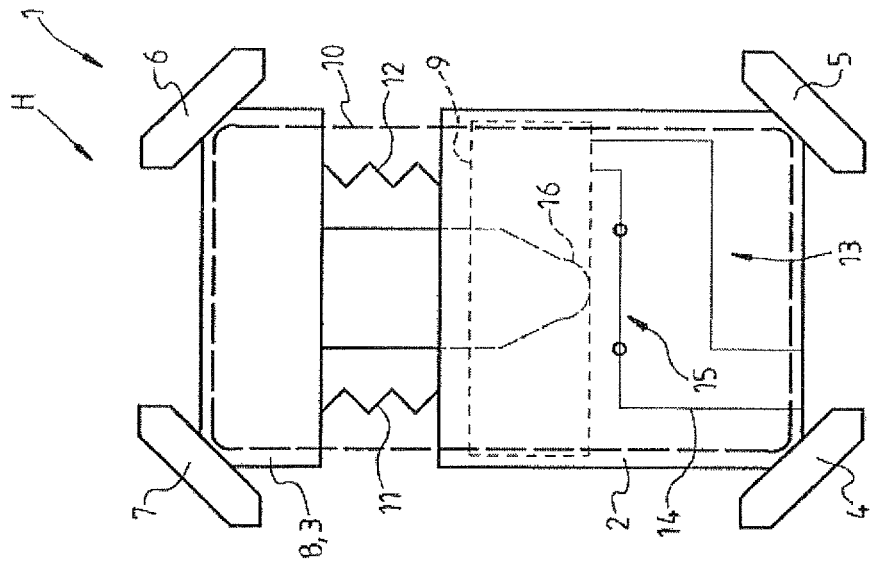
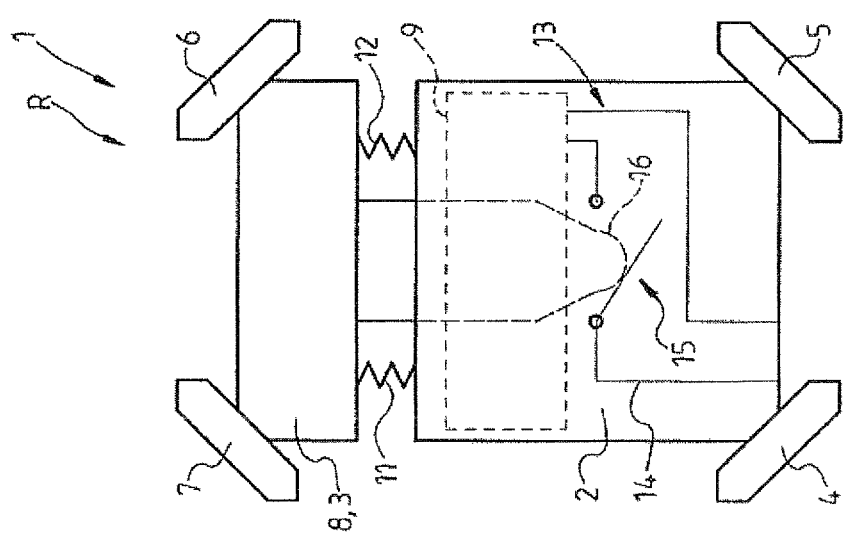

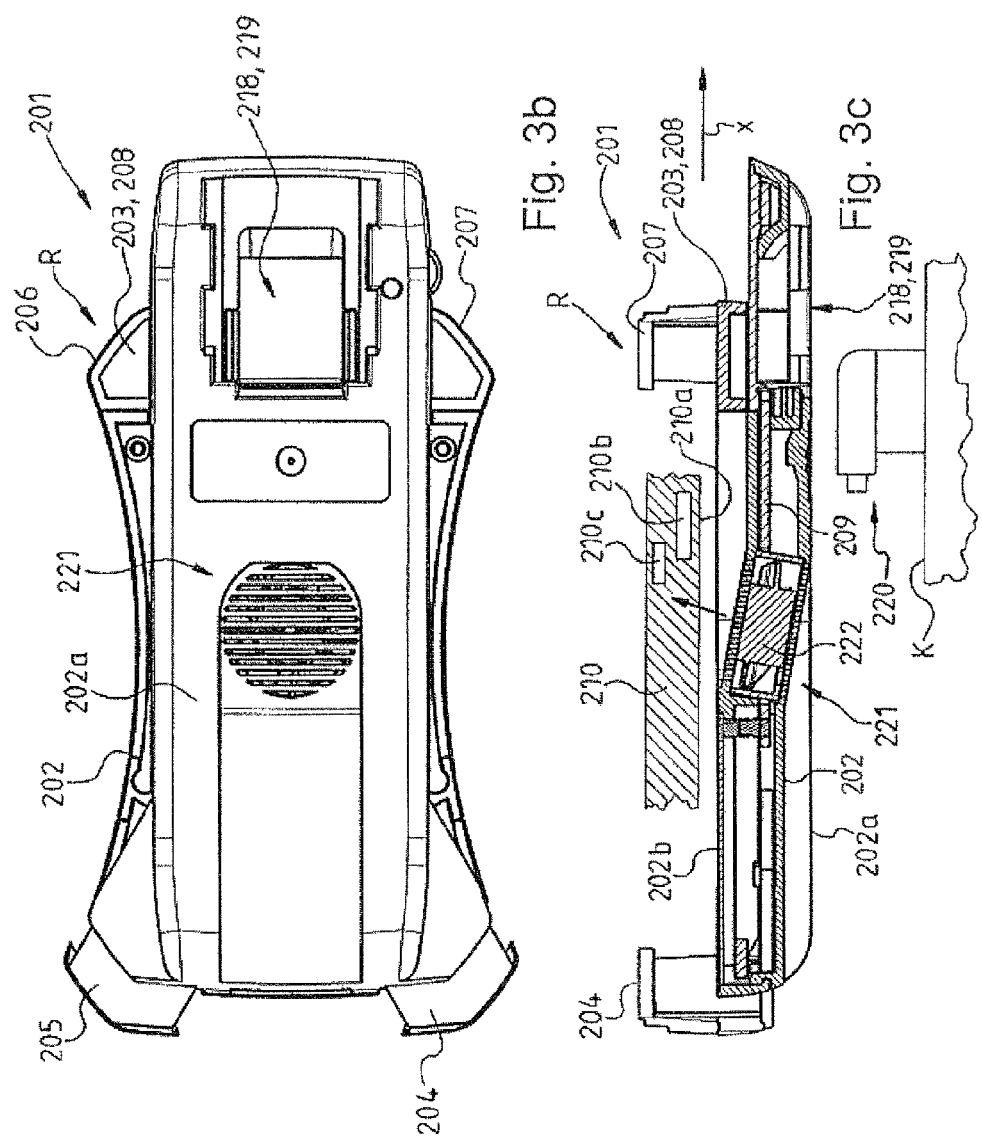

MOBILE TELEPHONE HOLDING DEVICE

BACKGROUND OF THE INVENTION

1. Field of the Invention

The present invention relates to a mobile telephone holding device.

2. Description of Related Art

DE 10 2011 110 680 A1 discloses a mobile telephone holding device which comprises a wireless electrical charging device and into which mobile telephones of different dimensions can be inserted.

SUMMARY OF THE INVENTION

The object of the present invention is to propose a mobile telephone holding device which is energy-saving and prevents unnecessary electromagnetic radiation in the vehicle interior.

In the mobile telephone holding device according to the present invention, the charging device or the charging device and a cooling device are supplied with power only when a mobile telephone is actually inserted into the mobile telephone holding device, wherein the presence of a mobile telephone is detected in a simple manner by the position of the arm with which the mobile telephone is clamped into the holding means. The consumption of power by the charging device or the charging device and the cooling device can be reduced in a simple manner by mechanically ascertaining the presence of a mobile telephone in this way. Furthermore, the creation of electromagnetic radiation is also avoided as a result, the electromagnetic radiation always occurring when charging devices, by virtue of activation of their charging coils, test whether a device which is to be charged is inserted.

By virtue of designing the arm as a movable sliding carriage, it is possible to match the mobile telephone holding device to mobile telephones of different sizes in a simple manner.

If two of the clamping elements are connected to the arm and two of the clamping elements are connected to the main body, it is possible to hold the mobile telephone at four corners and in this way to reliably prevent the clamping elements acting on buttons of the mobile telephone which are arranged around the edge of the mobile telephone.

As an alternative, provision is made to connect one of the clamping elements to the arm and to connect two of the clamping elements to the main body. In this way, the mobile telephone is reliably clamped into the holding device at three points.

Provision is further made to assign one switch to the arm, wherein the switch is, in particular, in the form of one of a microswitch, an optical switch and a sensor, in particular, in the form of a Hall sensor, wherein the switch is operated in the inoperative position of the arm in such a way that the electrical line is interrupted and therefore a power supply is interrupted, and that the switch is operated in each holding position of the arm in such a way that the electrical line is closed and therefore a power supply is established. The mobile telephone holding device can be produced in a convenient manner by virtue of the use of a microswitch. The use of an optical switch or other sensors makes the mobile telephone holding device particularly insensitive to vibrations since moving components are dispensed with in this case.

By virtue of designing the main body of the mobile telephone holding device with a base, it is possible to arrange the mobile telephone holding means in a cupholder, which is present in a motor vehicle, in a secure and reliable manner, so that the mobile telephone holding means can be used without a special holding means being fitted.

Provision is further made to equip the cooling device with at least one of a fan and a Peltier element. In this way, the mobile telephone and/or the charging device can be cooled in a simple manner, so that the situations of the mobile telephone and the charging device reaching impermissible temperatures and being undesirably switched off for safety reasons are prevented. According to further design variants, provision is also made, as an alternative or in addition to the at least one of the fan and the Peltier element, to provide at least one heat pipe on the charging device as the cooling device, heat being dissipated from at least one of the charge-receiving device of the mobile telephone and the charging device of the holding device by the heat pipe.

Finally, provision is also made to arrange the cooling device adjacent to at least one of the charging device of the mobile telephone holding device and the charge-receiving device of the mobile telephone. The local proximity to the at least one of the charging device and the charge-receiving device ensures effective cooling.

BRIEF DESCRIPTION OF THE DRAWINGS

Further details of the present invention will be described in the drawing with reference to schematically illustrated exemplary embodiments.

FIG. 1a shows a mobile telephone holding device according to the invention in an inoperative position;

FIG. 1b shows the mobile telephone holding device in a holding position;

FIGS. 3a-3c show three views of a third mobile telephone holding means according to the invention in an inoperative position.

DETAILED DESCRIPTION OF THE INVENTION

Figure 2:
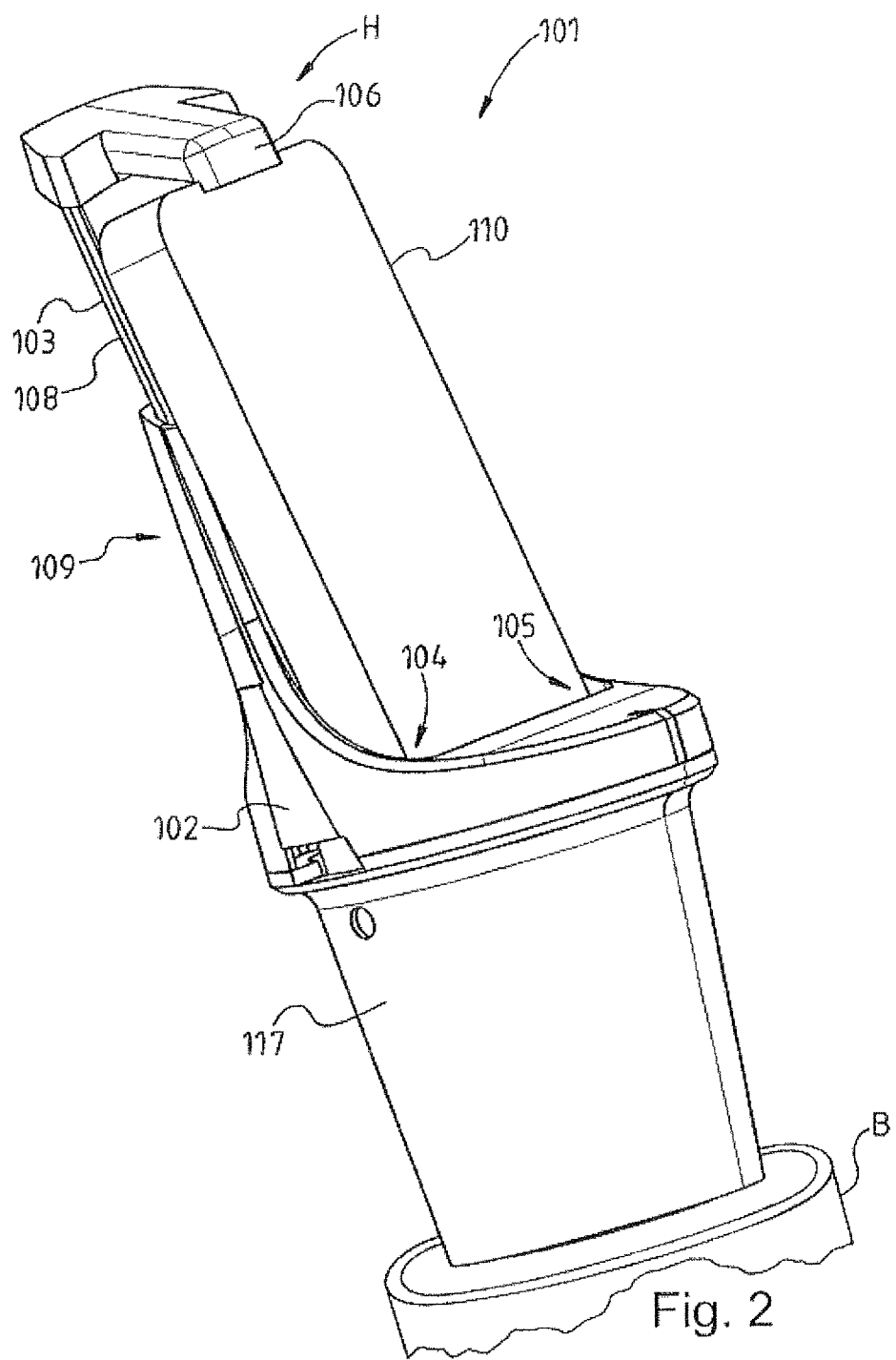
FIG. 2 shows a perspective view of a second mobile telephone holding means according to the invention in a holding position.

FIGS. 1a and 1b show schematic plan views of a mobile telephone holding device 1 according to the present invention, the mobile telephone holding device also being called holding device 1 in the text which follows. The holder device 1 comprises a main body 2, an arm 3, and four clamping elements 4, 5, 6 and 7. In this case, the clamping elements 4, 5 are arranged on the main body 2, and the clamping elements 6, 7 are arranged on the arm 3 which is in the form of one of a sliding carriage and a slide 8. The holding device 1 further comprises a wireless electrical charging device 9 with which a mobile telephone 10 (see FIG. 1b) can be charged. The one of the arm 3 and the slide 8 is mounted on the main body 2 in such a way that the one of the arm and slide can be moved between an inoperative position R, shown in FIG. 1a, and a holding position H, shown in FIG. 1b, against a restoring force of spring elements 11, 12. In this case, the arm 3 or the slide 8 permanently assumes the holding position H when the mobile telephone 10 is clamped between the clamping elements 4, 5, 6 and 7, wherein the clamping elements 4 to 7 act on corner regions of the mobile telephone 10 in order to prevent buttons which are arranged on the side of the mobile telephone being pressed. The holder device 1 further comprises an electrical switching device 13. The electrical switching device 13 supplies power to the charging device 9 depending on the position of the arm 3 or of the slide 8. In this case, an electrical line 14, which leads to the charging device 9, is interrupted in the inoperative position R of the arm 3 by a switch 15 for this purpose, the switch being operated by an operating means 16 which is connected to the arm 3. In the holding position H of the arm 3, the switch 15 is closed, so that the charging device 9 is supplied with power and the mobile telephone 10 which is situated in the holding means 1 can charge. In the inoperative position R, the power supply to the charging device 9 is interrupted, so that the charging device 9 cannot generate any electromagnetic radiation by way of its charging coils and also no energy is unnecessarily consumed when the charging device 9 tests, for example by activating its charging coils, whether a device which is to be charged is inserted into the holding means 1. In preferred design variants, the switching device 13 is switch 15, which comprises one of a microswitch, an optical switch, and a sensor, wherein the sensor is preferably designed as a Hall sensor.

FIG. 2 shows a perspective view of a further mobile telephone holding device 101 according to the present invention. The mobile telephone holding device is also called holding device 101 in the text which follows. The holding device 101 comprises a main body 102, an arm 103, and three clamping elements 104, 105 and 106. In this case, the clamping elements 104, 105 are arranged on the main body 102, and the clamping element 106 is arranged on the arm 103, which is in the form of one of a sliding carriage and a slide 108. The holding device 101 further comprises a wireless electrical charging device 109 with which a mobile telephone 110, which is accommodated in the holding device 101, can be charged. The one of the arm 103 and the slide 108 is mounted on the main body 102 in such a way that the one of the arm 103 and the slide 108 can be moved between an inoperative position and a holding position H, shown in FIG. 2, against a restoring force of spring elements, not illustrated. In this case, the arm 103 or the slide 108 permanently assumes the holding position H when the mobile telephone 110 is clamped between the clamping elements 104, 105 and 106, wherein the clamping elements 104, 105 act on corner regions of the mobile telephone 110 in order to prevent buttons of the mobile telephone which are arranged on the side of the mobile telephone 110 being undesirably pressed and wherein the clamping element 106 acts centrally on the mobile telephone 110 in order to keep the mobile telephone 110 free of torque. The holder device 101 further comprises an electrical switching device, not illustrated, which operates in a comparable manner to the switching device described in FIGS. 1a and 1b. The mobile telephone holding device 101 further comprises a base 117 which is matched to a cupholder B, schematically indicated, of a vehicle in such a way that the mobile telephone holding device 101 can be placed in the cupholder in a captive manner.

Figure 3A:
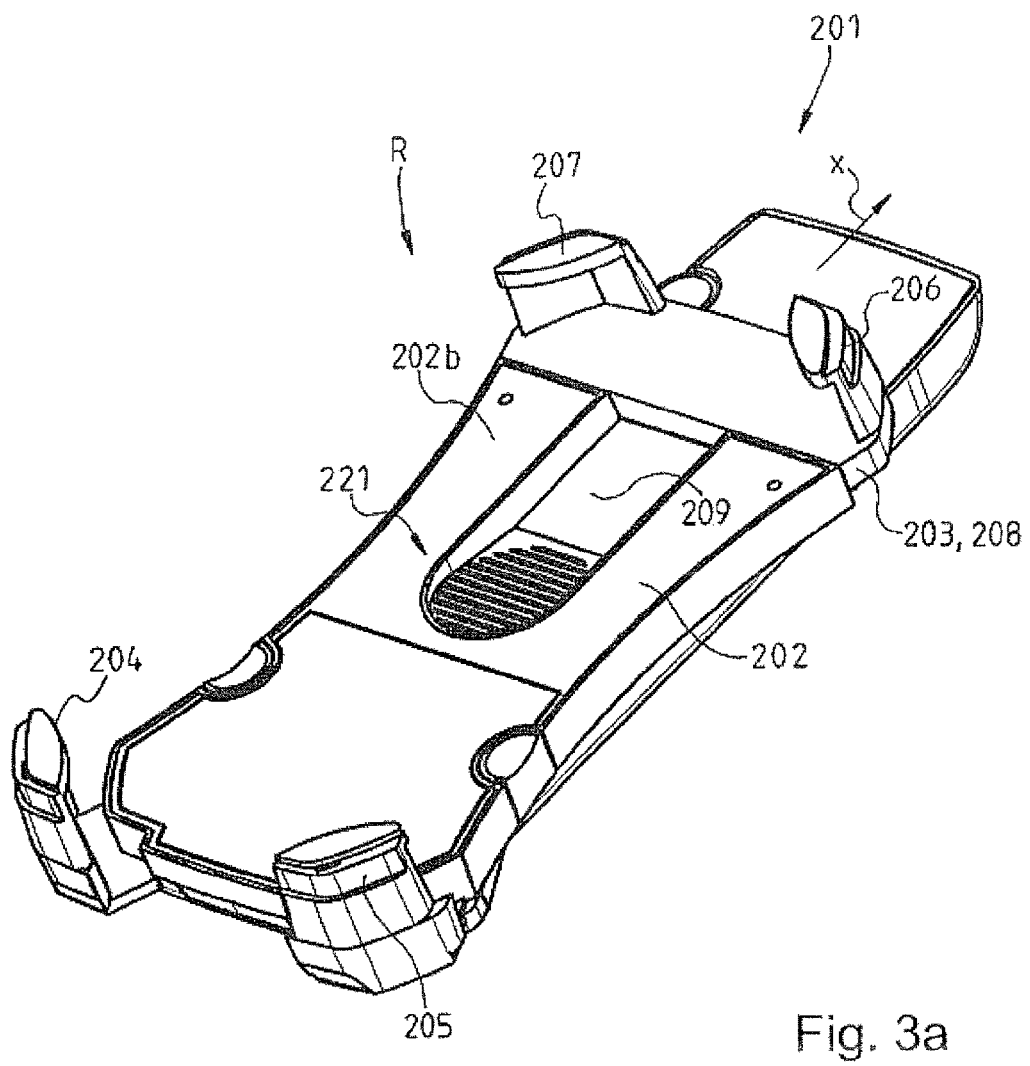

FIG. 3a shows a perspective view of a further mobile telephone holding device 201 according to the present invention. The mobile telephone holding device 201 is also called holding device 201 in the text which follows. FIG. 3b shows a bottom view of this holder device 201, and FIG. 3c shows a longitudinal section through this holding device 201. The holder device 201 comprises a main body 202, an arm 203, and four clamping elements 204, 205, 206 and 207. In this case, the clamping elements 204, 205 are arranged on the main body 202, and the clamping elements 206, 207 are arranged on the arm 203 which is in the form of one of a sliding carriage and a slide 208. The holding device 201 further comprises a wireless electrical charging device 209 with which a rechargeable battery 210c of a schematically illustrated mobile telephone 210 which is accommodated in the holding device 201 can be charged by means of a charge-receiving device 210b. In this respect, reference is made to FIG. 3c, in which the mobile telephone 210 is illustrated in parts for explanation purposes, even though the slide 208 in FIG. 3c and in FIGS. 3a and 3b is in an inoperative position R from which the slide 208 first has to be moved to the right relative to the main body 202 in arrow direction x so that the holding device 201 can actually receive the mobile telephone 210. The one of the arm 203 and the slide 208 is mounted on the main body 202 in such a way that the one of the arm 203 and slide 208 can be moved between a holding position H and the inoperative position R shown in FIGS. 3a to 3c against a restoring force which is applied by spring elements, not illustrated. In this case, the one of the arm 203 and the slide 208 permanently assumes the inoperative position R when no mobile telephone is clamped between the clamping elements 204, 205, 206 and 207, wherein the clamping elements 204, 205, 206 and 207 act on corner regions of the respectively inserted mobile telephone 210 in order to prevent buttons of the mobile telephone 210, which are arranged on the side of the mobile telephone 210 being undesirably pressed. The holder device 201 further comprises an electrical switching device, not illustrated, which operates in a comparable manner to the switching device described in FIGS. 1a and 1b. The mobile telephone holding device 201 further comprises an interface 218 which is in the form of a holding and plug socket 219 and with which the holder device 201 can be pushed onto a holding and mating plug 220, schematically indicated in FIG. 3c, which is mounted on a bracket K in the vehicle, and can be latched to the holding and mating plug 220. The holder device 201 further also comprises a cooling device 221 which comprises a fan 222. In this case, the cooling device 221 is arranged in the main body 202 of the holder device 201 between the clamping elements 204, 205, 206 and 207 in such a way that the cooling device 221 conveys air from a bottom face 202a of the main body 202 to a top face 202b of the main body 202 and blows air against a rear face 210a of the mobile telephone 210, schematically indicated in FIG. 3c. In order to increase the cooling effect, the cooling device 221 can additionally comprise a Peltier element, not illustrated. According to a further design variant, not illustrated, the cooling device 221 comprises only a Peltier element instead of a fan. The cooling device 221 is arranged adjacent to the charging device 209 of the holding device 201 and is also arranged adjacent to the charge-receiving device 210b of the mobile telephone 210, so that an undesired heating of the two charging components 209, 210b is prevented by the cooling device 221.

LIST OF REFERENCE SYMBOLS

1 Mobile telephone holding device, holding device
2 Main body
3 Arm
4-7 Clamping element
8 Sliding carriage or slide
9 Charging device
10 Mobile telephone
11, 12 Spring element
13 Electrical switching device
14 Electrical line
15 Switch
16 Operating means
101 Mobile telephone holding device, holding device
102 Main body
103 Arm
104-106 Clamping element
108 Sliding carriage or slide
109 Charging device
110 Mobile telephone
117 Base 201 Mobile telephone holding device
202 Main body
202a Bottom face of 202
202b Top face of 202
203 Arm
204-207 Clamping element
208 Sliding carriage or slide
209 Wireless electrical charging device
210 Mobile telephone
210a Rear face of 210
210b Charge-receiving device of 210
210c Rechargeable battery of 210
218 Interface of 201
219 Holding and plug socket on 201
220 Holding and mating plug
221 Cooling device
222 Fan
B Cupholder
H Holding position
K Vehicle bracket
R Inoperative position
x Arrow direction

The invention claimed is:

1. A mobile telephone holding device comprising:
a main body,
an arm,
at least two clamping elements,
a wireless electrical charging device with which a mobile telephone can be charged, and
an electrical switching device,
wherein at least one of the clamping elements is connected to the main body,
wherein at least one of the clamping elements is connected to the arm,
wherein the arm is mounted on the main body in such a way that said arm can be moved between an inoperative position (R) and at least one holding position (H) against a restoring force,
wherein the electrical switching device, depending on the position of the arm, interrupts an electrical line which leads to at least one of the charging device and a cooling device in the inoperative position (R) of the arm, and closes the electrical line which leads to the at least one of the charging device and the cooling device in each of the at least one holding position (H) of the arm.

2. The mobile telephone holding device according to claim 1, wherein the arm is in the form of a sliding carriage.

3. The mobile telephone holding device according to claim 1, wherein two of the clamping elements are connected to the arm, and in that two of the clamping elements are connected to the main body.

4. The mobile telephone holding device according to claim 1, wherein one of the clamping elements is connected to the arm, and in that two of the clamping elements are connected to the main body.

5. The mobile telephone holding device according to claim 1, further comprising a switch associated with the arm in such a way that said switch is operated in the inoperative position (R) of the arm in such a way that the electrical line is interrupted and therefore a power supply is interrupted, and in that said switch is operated in each of the at least one holding position (H) of the arm in such a way that the electrical line is closed and therefore a power supply is established.

6. The mobile telephone holding device according to claim 1, wherein the main body of the mobile telephone holding device comprises a base which is matched to a cupholder (B) of a vehicle in such a way that the mobile telephone holding device can be placed in a cupholder (B) of this kind in a captive manner.

7. The mobile telephone holding device according to claim 1, wherein the cooling device comprises at least one of a fan and a Peltier element.

8. The mobile telephone holding device according to claim 1, wherein the cooling device is arranged adjacent to at least one of the charging device of the mobile telephone holding device and the charge-receiving device of the mobile telephone.

* * * * *